United States Patent [19]

Sponholtz

[11] Patent Number: 5,635,228
[45] Date of Patent: Jun. 3, 1997

[54] METHOD OF PRODUCING A CHEESE AND PREPARING IT FOR DISTRIBUTION

[75] Inventor: Per Sponholtz, Gentofte, Denmark

[73] Assignee: Tetra Laval Holdings & Finance S.A., Pully, Switzerland

[21] Appl. No.: 330,103

[22] Filed: Oct. 27, 1994

Related U.S. Application Data

[63] Continuation of Ser. No. 11,836, Feb. 1, 1993, abandoned, which is a continuation of Ser. No. 782,321, Oct. 24, 1991, abandoned.

[30] Foreign Application Priority Data

Nov. 7, 1990 [SE] Sweden ................. 90035403

[51] Int. Cl.$^6$ ................................. A23C 9/12
[52] U.S. Cl. ................. 426/36; 426/34; 426/42; 426/580; 426/582
[58] Field of Search ................. 426/34, 35, 36, 426/37, 38, 39, 40, 42, 43, 580, 582, 426, 431, 478, 490, 491

[56] References Cited

U.S. PATENT DOCUMENTS

| | | |
|---|---|---|
| 1,694,921 | 12/1928 | Kaufmann et al. . |
| 2,982,654 | 5/1961 | Hammond et al. . |
| 3,620,768 | 11/1971 | Corbin . |
| 3,899,595 | 8/1975 | Stenne . |
| 4,131,688 | 12/1978 | Grosclaude et al. . |
| 4,194,001 | 3/1980 | Invernizzi et al. ................. 4426/8 |
| 4,194,011 | 3/1980 | Invernizzi et al. ................. 426/8 |
| 4,268,528 | 5/1981 | Montigny ................. 426/36 |
| 4,369,196 | 1/1983 | Sukegawa ................. 426/104 |
| 4,374,152 | 2/1983 | Loter ................. 426/39 |
| 4,384,438 | 5/1983 | Hilmersson ................. 53/51 |
| 4,401,679 | 8/1983 | Rubin et al. . |
| 4,460,609 | 7/1984 | Kristiansen et al. ................. 426/39 |

FOREIGN PATENT DOCUMENTS

| | | |
|---|---|---|
| 555869 | 6/1983 | Australia . |
| 0297676 | 1/1989 | European Pat. Off. . |
| 2475361 | 8/1981 | France . |
| 1413942 | 11/1975 | United Kingdom . |
| WO85/00501 | 2/1985 | WIPO . |
| 8500501 | 2/1985 | WIPO . |
| WO91/00690 | 1/1991 | WIPO . |

OTHER PUBLICATIONS

Journal of Dairy Science, vol. 62, No. 2, 1979, pp. 204–207, H.R. Covacevich, "Buffer, Lactic Fermentation, and Rennet Coagulation Properties of Skim Milk Retentates Produced by Ultrafiltration".

*Primary Examiner*—Leslie Wong
*Attorney, Agent, or Firm*—Burns, Doane, Swecker & Mathis, L.L.P.

[57] ABSTRACT

Method of preparing cheese for distribution through first concentrating milk through separation of the whey and then adding additives necessary for cheese production, e.g. rennet, and packaging in distribution-ready packagings. Through concentrating the milk to such an extent that it is given the same DM content as is desired in the finished cheese (what is known as full concentration) the milk and the added additives can be packaged in such a manner that both the coagulation of the milk and forming and maturing of the cheese essentially occur entirely in the packagings.

7 Claims, 1 Drawing Sheet

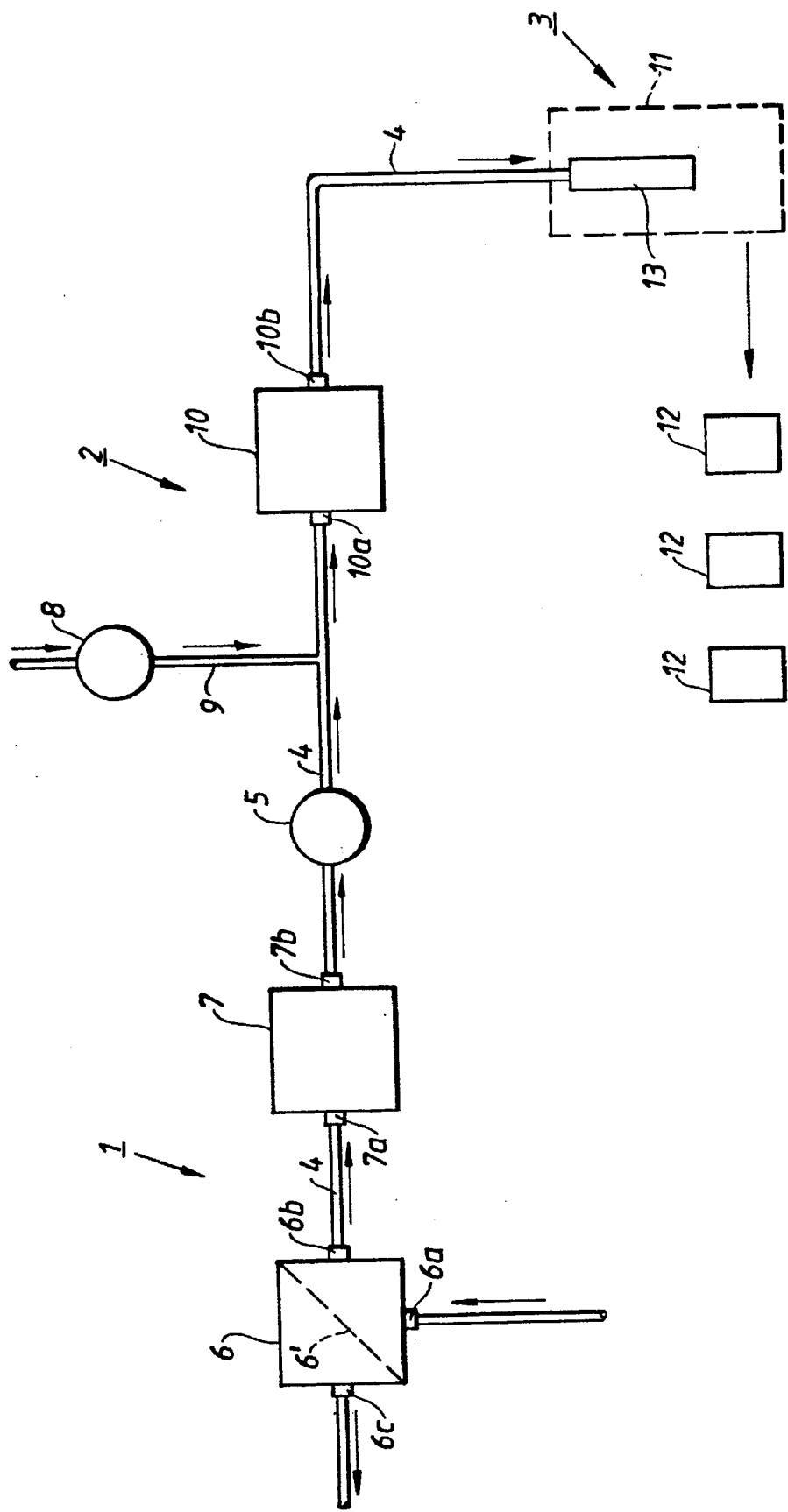

METHOD OF PRODUCING A CHEESE AND PREPARING IT FOR DISTRIBUTION

This application is a continuation of application Ser. No. 08/011,836, filed Feb. 1, 1993, now abandoned, which is a continuation of application Ser. No. 07/782,321, filed Oct. 24, 1991, now abandoned.

BACKGROUND OF THE INVENTION

1. Field of the Invention

The present invention concerns a method of producing a cheese and preparing it for distribution, in which method of cheese production pretreated milk is concentrated through the whey being separated from the milk and the concentrated milk being added to and mixed with additives necessary for coagulation of the milk.

2. Description of Relevant Art

In conventional production of cheese the milk pretreated for cheese production is mixed with additives necessary for coagulation of the milk, most frequently rennet and/or other proteolytic enzymes, to form a gel. When the gel has reached a predetermined solidity the gel is broken up with the aid of special tools, known as breaking tools, so that smaller cubes with the desired size are formed. The broken up cheese mass is then subjected to mechanical treatment at the same time as the mass is heated according to a preset scheme, through which the whey is pressed out of and separated from the mass. After conclusion of the treatment/heating the mass is placed in moulds which determine the cheese's final shape, after which the cheeses thus formed are packaged in packagings of different types intended for distribution.

The conventional procedure described is time-consuming and most frequently requires manual monitoring and control in order to maintain the constant process conditions necessary for the desired quality of cheese during each one of the production stages. The procedure is in additon one which from the point of view of equipment requires a great deal of space and can only with difficulty be automated and carried out on the desired rational industrial scale.

Problems of the above type are solved at least partly through another known production procedure which takes as its starting point the fact that the pretreated milk is first concentrated through a liquid fraction (whey) being separated from the milk and the concentrated (protein- and fat-enriched) milk obtained is then added to and mixed with additives necessary for coagulation of the milk. Here it has proven to be particularly valuable to concentrate the milk through ultra-filtering, through which the separated liquid fraction can be made practically free from protein, fat and other constituents desirable for cheese production occurring in the milk which are thus retained in the concentrated milk extracted as pre-cheese retained matter. According to this known technology among other things the advantage is gained that practically all valuable constituents occurring in the milk can be retained and depending on the degree to which the milk is concentrated the amount of rennet and/or other proteolytic enzymes added for the coagulation can be reduced to a corresponding degree with cost savings gained thereby. Further the advantage is gained that the production process after the milk concentration can be carried out with considerably less process equipment requiring space and investment than the previously described conventional cheese production.

SUMMARY AND OBJECTS OF THE INVENTION

In accordance with the present invention it has, however, been shown that the last described known production procedure can further be made more effective and an aim of the invention is therefore to give indications of a procedure for cheese production which functions well on a rational, industrial scale and which can in addition be carried out in a practically entirely automated manner.

This aim is achieved according to the invention through the fact that the procedure described in the introduction is given the characteristics that the milk is concentrated to a DM content corresponding to the DM content in the finished cheese and that the mixture of concentrated milk and additives is drawn off and packaged directly into distribution-ready packagings.

Through concentrating the milk from the beginning to a DM content corresponding to the DM content of the finished cheese a subsequent further whey separation stage is thus avoided, at the same time as such a concentration entails that the mixture of concentrated milk and additives can be packaged directly into the finished packagings without a previous coagulation stage. In the method according to the invention the coagulation of the milk thus occurs practically entirely in these packagings.

According to the invention it has proved to be possible and particularly valuable to use as packagings for the coagulated cheese mass the same type of packagings as is often used to package liquid foods of the type milk, juice, etc., which are produced with the aid of modern, rational packaging machines of the type which both forms, fills and closes the finished packagings. A well known example of such a packaging is the packaging manufactured from a strip of plastic coated paper of the type TETRA BRIK (trade mark) U.S. Pat. No. 4,384,438 discloses a TETRA BRIK packaging machine that continuously forms packaging material into a tube. The tube is filled with contents, sealed transversely at selected locations, and severed to form individual, distribution-ready packages.

Further practical and advantageous embodiments of the method according to the invention have further been given the special features in the sub-claims below.

BRIEF DESCRIPTION OF THE DRAWING

The Figure shows schematically a suitable process arrangement for carrying out the method.

DETAILED DESCRIPTION OF PREFERRED EMBODIMENTS

The arrangement shown in the drawing comprises principally a concentrating/heating station 1, a dosing/mixing station 2 and a filling station 3, which are connected to each other in the above order by a common process pipe 4. Between the concentrating/heating station 1 and the dosing/mixing station 2 there is in addition a pump 5 linked to the process pipe 4.

The concentrating/heating station 1 has on the one hand a concentrating device 6 with inlet 6a for incoming pretreated milk, outlet 6b for concentrated milk and outlet 6c for separated liquid fraction (whey) and on the other hand a heating device 7 provided with an inlet 7a and outlet 7b, with the inlet 7a of the heating device 7 being connected to the outlet 6b of the concentrating device 6 through the said process pipe 4.

The concentrating device 6 can conveniently consist of an ultra-filtering device of a type which is in itself known, whose filter 6' has such a pore size that all proteins, fats and other constituents valuable for cheese production occurring in the milk remain in the concentrated milk extracted as pre-cheese retained matter through filtering. The heating device 7 can for example be a conventional heat exchanger with the aid of which the concentrated milk coming in from the concentrating device 6 is heated up to and kept for a sufficiently long time at a sufficiently high temperature to kill off all harmful microorganisms occurring in the milk, e.g. c. 68° for c. 20 sec.

The dosing/mixing station 2 comprises a dosing pump 8 which is connected in-line through a pipe 9 to the process pipe 4 and with the aid of which additives necessary for cheese production are fed to the concentrated and heated milk pumped by pump 5 to the station 2. The dosing/mixing station 2 further comprises a mixing device 10 provided with an inlet 10a and outlet 10b for mixing the additives fed to it with the concentrated milk.

The filling station 3 consists preferably of a packaging machine of the type which was described earlier and which forms, fills and closes finished packagings 12. The filler pipe 13 attached to the packaging machine 11 is here connected to the outlet 10b of the mixing device 10 via the process pipe 4 in such a way that the mixture of concentrated milk and added additives can be fed directly from the mixing device 10 to the filler pipe of the packaging machine for filling into the distribution-ready packagings 12. With the aid of the above described device a cheese is produced and prepared for distribution in the following manner according to the present invention. It is assumed in this explanatory embodiment that the finished cheese is to have a dry matter content (DM content) of c. 40–70% and further that the device for concentrating the milk pretreated for cheese production is an ultra-filtering device with a filter whose pore size is such that proteins, fats and other constituents valuable for cheese production occurring in the milk cannot pass through the filter but are retained in the concentrated milk extracted as pre-cheese retained matter. It is further assumed that the heating device is a conventional heat exchanger with capacity to heat up and keep the concentrated milk for a sufficiently long time at a sufficiently high temperature to neutralise all harmful microorganisms occurring in the milk, e.g. 68° C. for c. 20 sec. Finally it is assumed that the milk selected for cheese production is standardised milk.

The standardised milk is introduced into the ultra-filtering device 6 through a product pipe 14 connected to the inlet 6a for concentration of the milk to a DM content corresponding to the DM content in the finished cheese, i.e. c. 40–70%. In the ultra-filtering device a liquid fraction (whey) practically free from protein, fat and other valuable constituents occurring in the milk is thus separated and this can pass freely through the filter. The separated liquid fraction is drained off from the ultra-filtering device through an outlet pipe connected to the outlet 6c, while the concentrated (protein- and fat-enriched) milk retained by the filter is taken out from the ultra-filtering device through the process pipe 4 connected to the outlet 6b and is pumped with the aid of the pump 5 into and through the heat exchanger 7 for heating up to c. 68° for c. 20 sec. From the heating device the heated, concentrated milk is taken out and pumped further through the process pipe 4 to the dosing/mixing station 2 in which additives necessary for coagulation of the milk, e.g. rennet, together with other additives selected for the cheese production, are added to the milk with the aid of dosing pump 8 through the pipe 9 connected in-line to the process pipe 4. The mixture of concentrated milk and the aforesaid additives is taken further through the process pipe 4 into the mixing device 10 so as to mix the added additives homogeneously with the concentrated milk. From the mixing device the ready mixed mixture is fed through the process pipe 4 connected to the outlet 10b into the filler pipe fitted to the packaging machine 11 at the filling station 3 for drawing off and enclosing in distribution-ready packagings 12, as shown schematically in the drawing.

With the aid of the device shown cheeses of practically any desired type can be produced and prepared for distribution. For example it has been shown according to the invention to be possible to produce a cheese with a chemical composition with regard to fat, total protein, salt and DM content corresponding to a semi-solid, ripe cheese of SCT. Paulin type (popularly called a soft Danbo) with the use of the following additives:

—glucone lactone (GDL, chemical acidification agent) which on slurrying in the water converts from a pH-neutral product to an acid product containing lactic acid with a pH value of 5.2.
Colorants
Flavourings
NaCl
Rennet Through suitable choice of additives in this sphere which are in themselves known it is thus possible continuously to produce and prepare for distribution cheeses of different types on a rational industrial scale in the manner according to the invention which in contrast to the hitherto known procedures can be carried out with a minimum number of involved production stages and which through the included full concentration of the milk before the addition of the additives selected for the cheese production offers the substantial advantage that the mixture of the milk and the aforesaid additives can be filled directly and packaged into distribution-ready packagings in such a way that the coagulation of the milk and also the forming of the cheese occur essentially entirely in these packagings.

I claim:

1. Method of producing a finished cheese and preparing it for distribution comprising the steps of (i) concentrating standardized milk in an ultrafiltration device by separating whey from the milk to a dry material content of about 40–70% equal to a dry material content of the finished cheese, (ii) forming a mixture by adding the concentrated milk to and mixing the concentrated milk with additives necessary for coagulation of the concentrated milk together with at least one of glucono-delta-lactone, colorants, flavorings, and sodium chloride, and (iii) filling and packaging the mixture directly in distribution-ready packagings, the mixture coagulating and forming the finished cheese in said packagings, the method being performed entirely within a closed system such that the concentrating, mixture forming, and filling and packaging steps are performed without any exposure of the milk and the mixture to an environment surrounding the system.

2. Method according to claim 1 wherein a filter of the ultrafiltration device has a pore size such that proteins and fats occurring in the milk are retained in the concentrated milk obtained as pre-cheese retained matter.

3. Method according to claim 1 wherein rennet is used as an additive for coagulation of the milk.

4. A method of continuously producing a packaged cheese product, comprising the steps of:

continuously separating, with an ultrafiltration device, at a separating station, a stream of standardized milk into a liquid fraction and a concentrated milk fraction having a dry material content of between 40 and 70 percent;

continuously conducting the concentrated milk fraction from the separating station to a heating station;

continuously heating, at the heating station, the concentrated milk fraction to a sufficiently high temperature, and maintaining the concentrated milk at that temperature for a sufficiently long time, to kill off all harmful microorganisms occurring in the milk;

continuously conducting the heated concentrated milk fraction through a process pipe from the heating station to a mixing station;

continuously dosing the heated concentrated milk fraction as it is conducted through the process pipe, through a single dosing pipe, with all additives selected for cheese production, the additives including additives necessary for coagulation of the concentrated milk fraction and at least one of glucono-delta-lactone, colorants, flavorings, and sodium chloride;

continuously mixing, in the mixing station, the heated concentrated milk fraction dosed with the additives to form a mixture;

continuously conducting the mixture from the mixing station to a packaging station;

directly filling packages with the mixture at the packaging station;

sealing packages filled with the mixture at the packaging station, the mixture coagulating and forming a finished cheese in the sealed packages, the cheese having a dry material content equal to the dry material content of the concentrated milk fraction; and the method being performed entirely within a closed system such that the separating, conducting, heating, dosing, mixing, filling, and sealing steps are performed without any exposure of the milk and the mixture to a surrounding environment.

5. A method of producing a packaged cheese product, comprising the steps of:

continuously separating a stream of standardized milk into a liquid fraction and a concentrated milk fraction having a dry material content of 40–70% by conducting the stream through an ultrafiltration concentrating device;

continuously conducting the concentrated milk fraction through a pipe to a mixing station;

continuously supplying all additives selected for cheese production, the additives including additives necessary for coagulation of the concentrated milk and at least one of glucono-delta-lactone, colorants, flavorings, and sodium chloride, from a dosing pump and into the pipe containing the concentrated milk fraction solely at an adding point between the concentrating device and the mixing station;

continuously conducting the concentrated milk fraction and additives from the mixing station to a packaging station;

continuously forming a tube of packaging material at the packaging station;

continuously, directly filling the tube with the concentrated milk fraction and additives at the packaging station;

forming sealed, distribution-ready packages from the tube filled with the concentrated milk fraction and additives at the packaging station, the concentrated milk fraction and additives coagulating in the packages to form a cheese having a dry material content equal to the dry material content of the concentrated milk fraction; and the method being performed entirely within a closed system such that the concentrating, conducting, supplying, filling, and package forming steps are performed without any exposure of the milk and the mixture to a surrounding environment.

6. The method according to claim 5, comprising the further step of continuously heating the stream of milk in a heating device between the adding point and the concentrating device.

7. A method of producing a finished cheese and preparing it for distribution, comprising the steps of:

continuously concentrating standardized milk by separating whey from the milk with an ultrafiltration device to a dry material content equal to a dry material content of the finished cheese;

continuously forming a mixture by adding the concentrated milk to and mixing the concentrated milk with additives necessary for coagulation of the concentrated milk together with at least one of glucono-delta-lactone, colorants, flavorings, and sodium chloride;

continuously forming a tube of packaging material;

continuously, directly filling the tube with the mixture;

forming sealed, distribution-ready packages from the tube filled with the mixture, the mixture coagulating and forming the finished cheese in said packages; and the method being performed entirely within a closed system such that the concentrating, mixture forming, filling, and package forming steps are performed without any exposure of the milk and the mixture to a surrounding environment, wherein the milk is concentrated to a dry material content of 40 to 70 percent.

\* \* \* \* \*